C. F. FERNALD.
GAGE GLASS COCK.
APPLICATION FILED JAN. 6, 1911.
993,232.
Patented May 23, 1911.
2 SHEETS—SHEET 1.
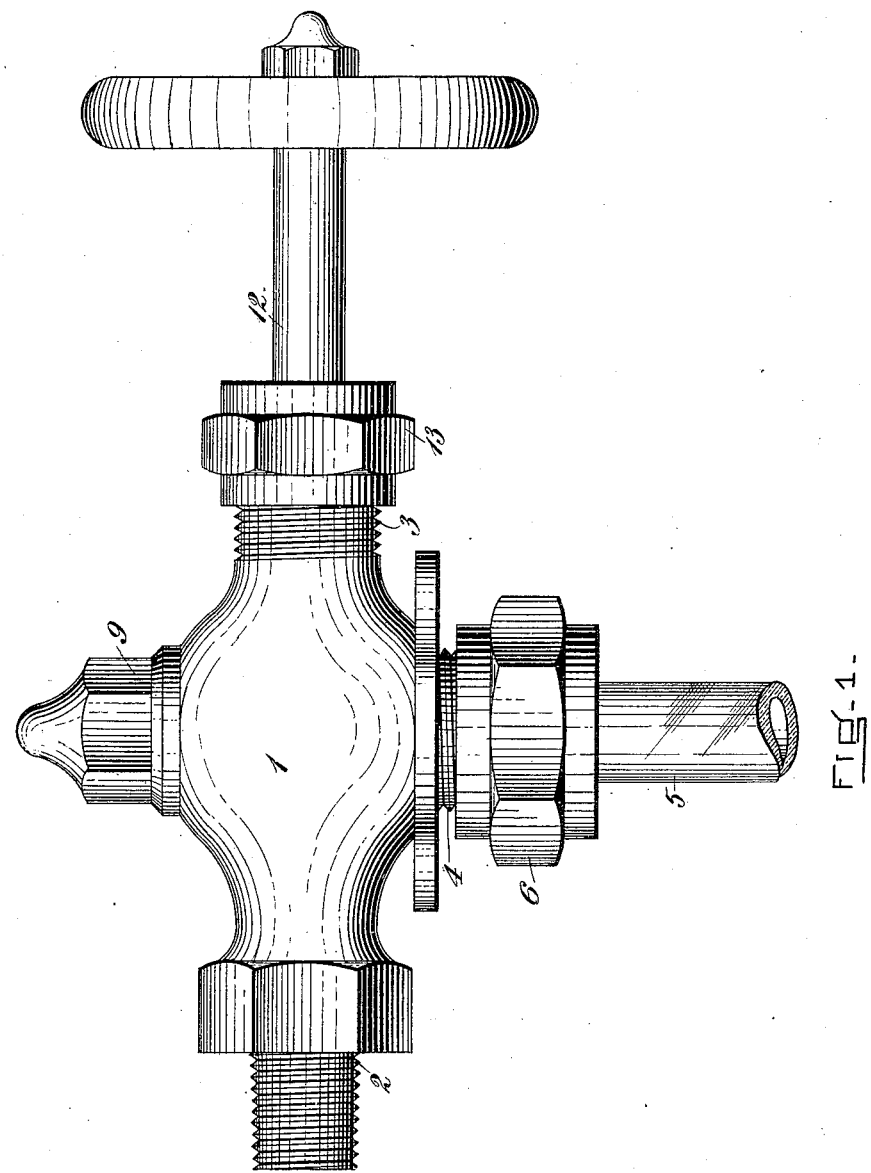
WITNESSES:
M. C. Flaherty.
George Langton
INVENTOR:
Charles F. Fernald
by his attys
Clarke Raymond & Cross C. F. FERNALD.
GAGE GLASS COCK.
APPLICATION FILED JAN. 6, 1911.
993,232.
Patented May 23, 1911.
2 SHEETS—SHEET 2.
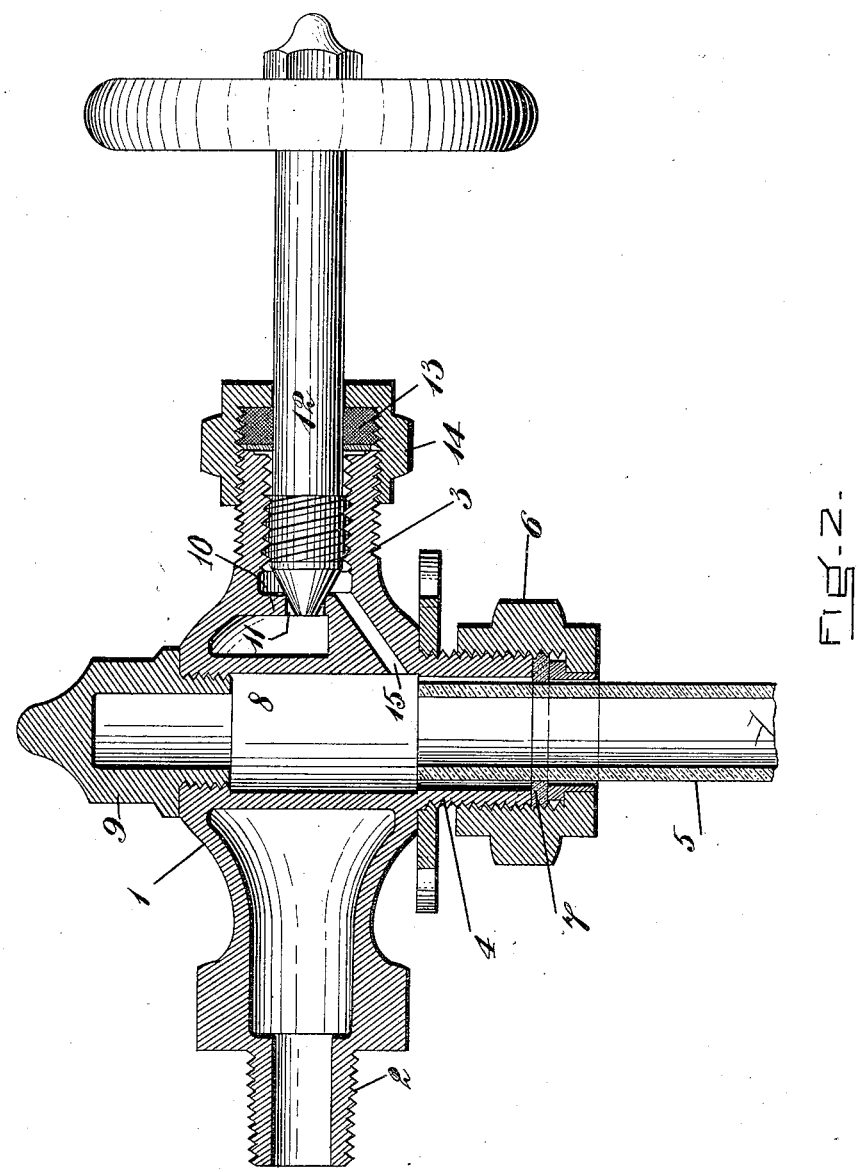
WITNESSES:
M. E. Flaherty.
George Langton
INVENTOR:
Charles F. Fernald
by his attys
Clarke Raymond & Coale

UNITED STATES PATENT OFFICE.

CHARLES F. FERNALD, OF BOSTON, MASSACHUSETTS, ASSIGNOR TO STAR BRASS MANUFACTURING COMPANY, OF BOSTON, MASSACHUSETTS, A CORPORATION OF MASSACHUSETTS.

GAGE-GLASS COCK.

993,232.  Specification of Letters Patent.  Patented May 23, 1911.

Application filed January 6, 1911. Serial No. 601,061.

*To all whom it may concern:*

Be it known that I, CHARLES F. FERNALD, of Boston, in the county of Suffolk and State of Massachusetts, a citizen of the United States, have invented a new and useful Improvement in Gage-Glass Cocks, of which the following is a full, clear, and exact description, reference being had to the accompanying drawings, forming a part of this specification, in explaining its nature.

The object of my invention is to provide a cock of the above described type in which the glass is removable by withdrawal longitudinally through the body of the cock when the valve controlling the cock is closed, at which time also the pressure entering the cock will be shut off not only from the glass but also from the packing for the valve.

My invention can best be seen and understood by reference to the drawings in which—

Figure 1 shows the cock in side elevation, and Fig. 2 the same in section.

1 represents the body of the cock. At one side this body is provided with a fitting 2 preferably tubular in form and exteriorly threaded by which the cock may be attached to its proper fixture of support and through which fitting also the fluid under pressure enters the chamber formed inside the body of the cock. On the other side of the body of the cock, or the side opposite said fitting, the body of the cock is provided with an extension 3 forming a valve casing and inside said casing a valve chamber. The body of the cock is also provided with a stem 4 into which fits the glass 5. This glass is retained in any suitable manner and preferably as shown by means of a packing nut 6 threaded upon the stem and holding packing 7 between it and the end of the stem around the glass. It will be observed that the body of the cock is provided with openings through the opposite walls thereof in longitudinal alinement with said stem and the glass fitting into the same. These openings, however, are closed from the chamber formed inside the body of the cock by means of an inside connection 8 which extends through said body of the cock and provides a passage through the same in communication with the cavity of the stem 4 by which means the glass may be withdrawn longitudinally through this passage and accordingly through the body of the cock. The outer end of this passage is normally closed by a plug 9 threaded to fit inside the same.

The valve chamber formed within the valve casing 3 is separated from the chamber formed within the body of the cock by means of a partition 10. This partition has within it a port 11 forming a port of communication between the two chambers. The port 11 is controlled by a screw valve 12 located within the valve casing. The valve is packed by means of a packing nut 14 connecting with the valve casing and retaining packing 13 between it and the end of said casing around the stem of the valve. Leading out of the valve chamber and connecting the same with the cavity of the stem 4 which receives the glass or passage connecting therewith is a bypass 15.

In the operation of the cock when the valve 12 is open fluid under pressure will enter by way of the fitting tube to pass through the body of the cock around the inside connection 8, thence through the port 11 into the valve chamber and thence down to the glass by way of the bypass 15. In case it is desired to remove the glass then the valve 12 is closed against the partition 10 forming a valve seat around the port therein, closing this port and shutting off communication between the valve chamber and the chamber inside the body of the valve. The fluid is then accordingly entirely cut off from the valve chamber and from the glass. The glass may then be withdrawn longitudinally through the body of the valve by way of the inside connection 8 after first loosening its packing and removing the plug 9; or in case it is desired only to repack the stem of the valve 12 this may safely be done simply by closing the valve for, as said before, when the valve is closed fluid can no longer enter the valve chamber inasmuch as the fluid can enter only through the partition by way of the port in it and this port is entirely closed by the closing of the valve.

Having thus fully described my invention, I claim and desire to secure by Letters Patent of the United States:—

1. A gage cock having a chambered body provided with a glass receiving stem, said body being provided with openings through the opposite walls thereof in alinement with said stem, an inside connection passing through said body in the line of said openings and closing the same from the chamber of said body, means for closing the outer end of said passage, a valve casing extending from said body and forming a valve chamber, a partition separating the chamber of said valve casing from the chamber of said body, said partition having a port therein providing communication between said chambers, said body of the cock being provided also with a bypass leading from the chamber of said valve casing to the cavity of said glass receiving stem or passage connecting therewith, a valve located within said valve casing for controlling the port in said partition, and means for packing said valve.

2. A gage cock having a chambered body and on one side thereof a fixture having an entrance therethrough into said body, said body having also a glass receiving stem, said body being further provided with openings through the opposite walls thereof in alinement with said stem, an inside connection passing through said body forming a passage through the same in the line of said openings and closing the same from the chamber of said body, means for closing the outer end of said passage, an extension from said body forming a valve casing and chamber inside the same, a partition separating said valve chamber from the chamber of said body, said partition having an opening therein forming a port of communication between said chambers, said body of the cock being provided also with a bypass leading from said valve chamber and connecting with the cavity of said stem or passage connecting therewith, a valve located within said valve chamber for controlling said port, and means for packing said valve.

CHARLES F. FERNALD.

Witnesses:
JOHN E. R. HAYES,
GEORGE LANGTON.

---

Copies of this patent may be obtained for five cents each, by addressing the "Commissioner of Patents, Washington, D. C."